(12) United States Patent
Barrey et al.

(10) Patent No.: US 6,197,115 B1
(45) Date of Patent: Mar. 6, 2001

(54) ROBOT BASED SEALANT DISPENSER

(75) Inventors: Bruno Barrey, Clinton Township; Claus Madsen, Bloomfield Hills; Peter J. Deir, Fraser, all of MI (US)

(73) Assignee: ABB Flexible Automation Inc., New Berlin, WI (US)

( * ) Notice: Subject to any disclaimer, the term of this patent is extended or adjusted under 35 U.S.C. 154(b) by 0 days.

(21) Appl. No.: 09/281,450

(22) Filed: Mar. 30, 1999

(51) Int. Cl.⁷ .............................. B05C 11/08; B05C 13/02
(52) U.S. Cl. .................. 118/681; 118/680; 118/679; 118/503; 118/500; 901/31; 901/43
(58) Field of Search ..................................... 118/669, 676, 118/679, 680, 681, 683, 684, 500, 503, 668, 692, 686; 901/43, 31, 41; 269/71; 700/114

(56) References Cited

U.S. PATENT DOCUMENTS

| | | |
|---|---|---|
| 4,348,623 | 9/1982 | Kobayashi et al. . |
| 4,896,274 * | 1/1990 | Hohn et al. ............................ 700/41 |
| 4,938,383 | 7/1990 | Yamazai et al. . |
| 5,046,666 | 9/1991 | Ono . |
| 5,292,066 | 3/1994 | Torii et al. . |
| 5,292,368 | 3/1994 | Komine et al. . |
| 5,315,222 | 5/1994 | Kasagami et al. . |
| 5,319,568 | 6/1994 | Bezaire . |
| 5,348,585 | 9/1994 | Weston . |
| 5,407,100 | 4/1995 | Tracy et al. . |

\* cited by examiner

*Primary Examiner*—Richard Crispino
*Assistant Examiner*—George R. Koch, III
(74) *Attorney, Agent, or Firm*—Harness, Dickey & Pierce, P.L.C.

(57) ABSTRACT

An automated system for performing an operation on a component within a manufacturing workstation is disclosed. The system includes a robot controller having seven axes of motion control. A robotic manipulator is connected to the robot controller and has six axes of motion. The robotic manipulator includes tooling for grasping the component upon which the operation is performed. A fixed location tool is provided for performing the operation, and a servo mechanism is provided for operating the fixed location tool. The servo mechanism is controlled by one of the seven axes of motion control of the robot controller, whereby the robotic manipulator moves the component with respect to the fixed location tool for performing the operation.

20 Claims, 5 Drawing Sheets

ROBOT BASED SEALANT DISPENSER

BACKGROUND OF THE INVENTION

1. Technical Field

The present invention generally relates to a robot controlled sealant dispenser for use in a manufacturing environment. More particularly, the present invention is directed to a robot controlled sealant dispensing system which allows all six axes of the robotic manipulator to be utilized during the sealant dispensing and application process.

2. Discussion

Robot based manufacturing continues to find new applications as the technology for controlling and implementing robot based systems is improved. One particular use for robot based systems is the dispensing and application of sealant to individual parts to be assembled, such as those parts found in an automotive assembly facility. A variety of systems have been developed to implement this robot based automation technique. One such application involves utilizing one of the robot's motion axes to drive a dispensing pump mounted to the robot's end effector. This motion axis is sometimes referred to as the sixth axis of control. However, this application limits the motion of the robotic manipulator because only five of the typical six axes of motion are available. As a result, the robot manipulator is limited to applying sealant to a surface lying completely in a single dimensional plane. Thus, the functionality of this robotic manipulator design is severely limited for applications having a surface lying in two or more dimensional planes.

In addition, more complex hardware is required for supporting the sealant dispenser because it is always in motion with the end effector of the robotic manipulator. A substantial amount of weight is also placed on the robot end effector which can lead to uneven or inconsistent movement of the robotic manipulator. This inconsistent movement translates into error, which then reduces the benefits of using a high precision robot for the manufacturing task.

To achieve maximum flexibility in the manufacturing environment, it is desirable that the robot manipulator utilize all six axes of motion so that the end effector can be moved into any desired position. It is also desirable to remove the sealant dispenser from the robot manipulator, and mount the sealant dispenser in a fixed location. This in turn would remove a substantial amount of weight from the end effector of the robot, and increase the accuracy of the robot's movements. According to this envisioned design, the robotic manipulator can be used for moving parts to which sealant is to be applied about or underneath the fixed location sealant dispenser. Finally, it is desirable to operate the sealant dispenser with a feedback controlled servo mechanism for increasing the precision of the sealant application process.

SUMMARY OF THE INVENTION

In accordance with the present invention, an automated system for performing an operation on a component within a manufacturing workstation is disclosed. The system includes a robot controller having seven axes of motion control. A robotic manipulator is connected to the robot controller and has six axes of motion. The robotic manipulator includes tooling for grasping the component upon which the operation is performed. A fixed location tool is provided for performing the operation, and a servo mechanism is provided for operating the fixed location tool. The servo mechanism is controlled by one of the seven axes of motion control of the robot controller, whereby the robotic manipulator moves the component with respect to the fixed location tool for performing the operation.

BRIEF DESCRIPTION OF THE DRAWINGS

Additional objects, advantages and features of the present invention will become apparent from the following description and appended claims, taken in conjunction with the accompanying drawings in which:

DETAILED DESCRIPTION OF THE PREFERRED EMBODIMENT

Figure 1:
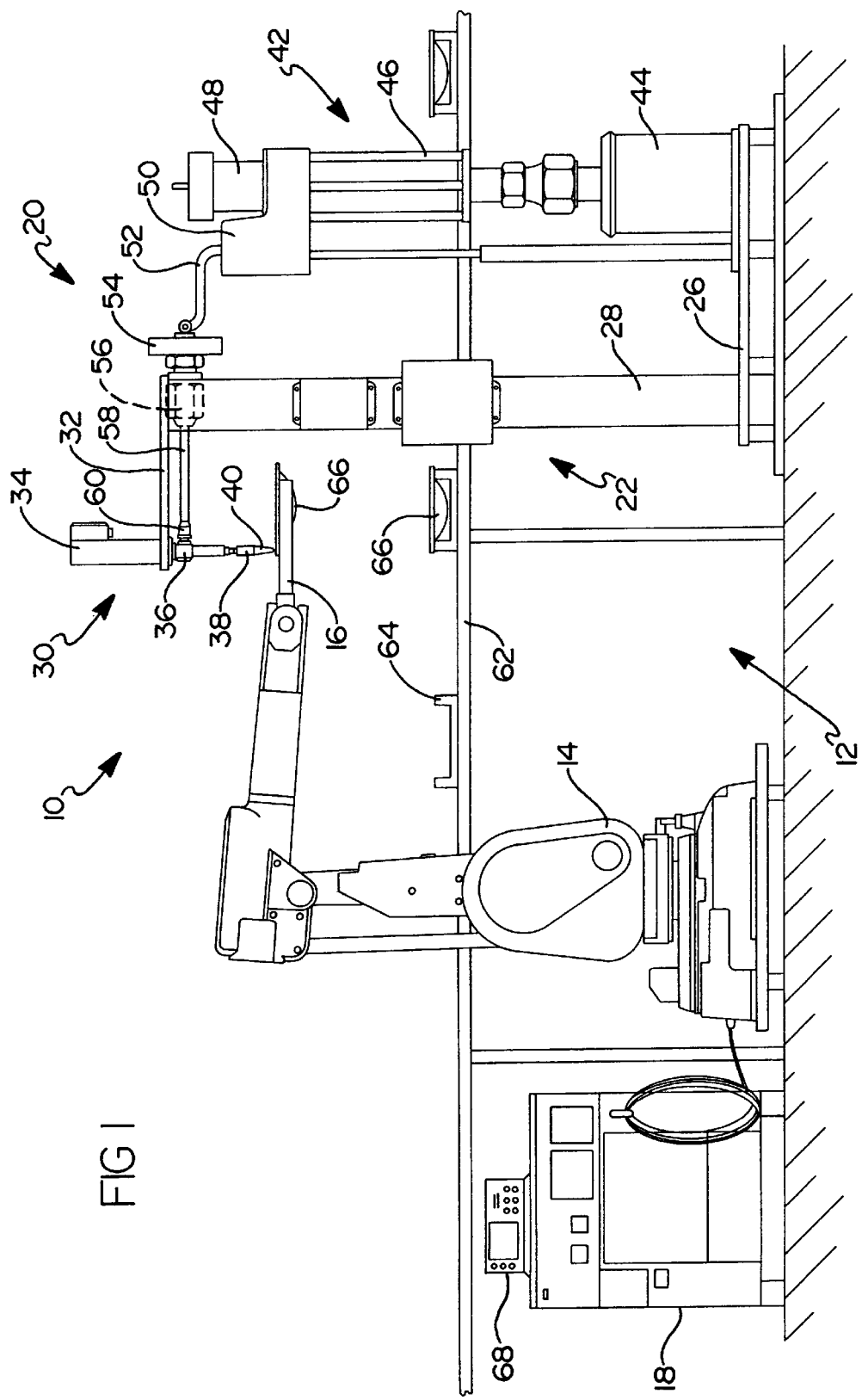
FIG. 1 is an environmental view of the robot based sealant dispensing system in accordance with a preferred embodiment of the present invention.
Figure 2:
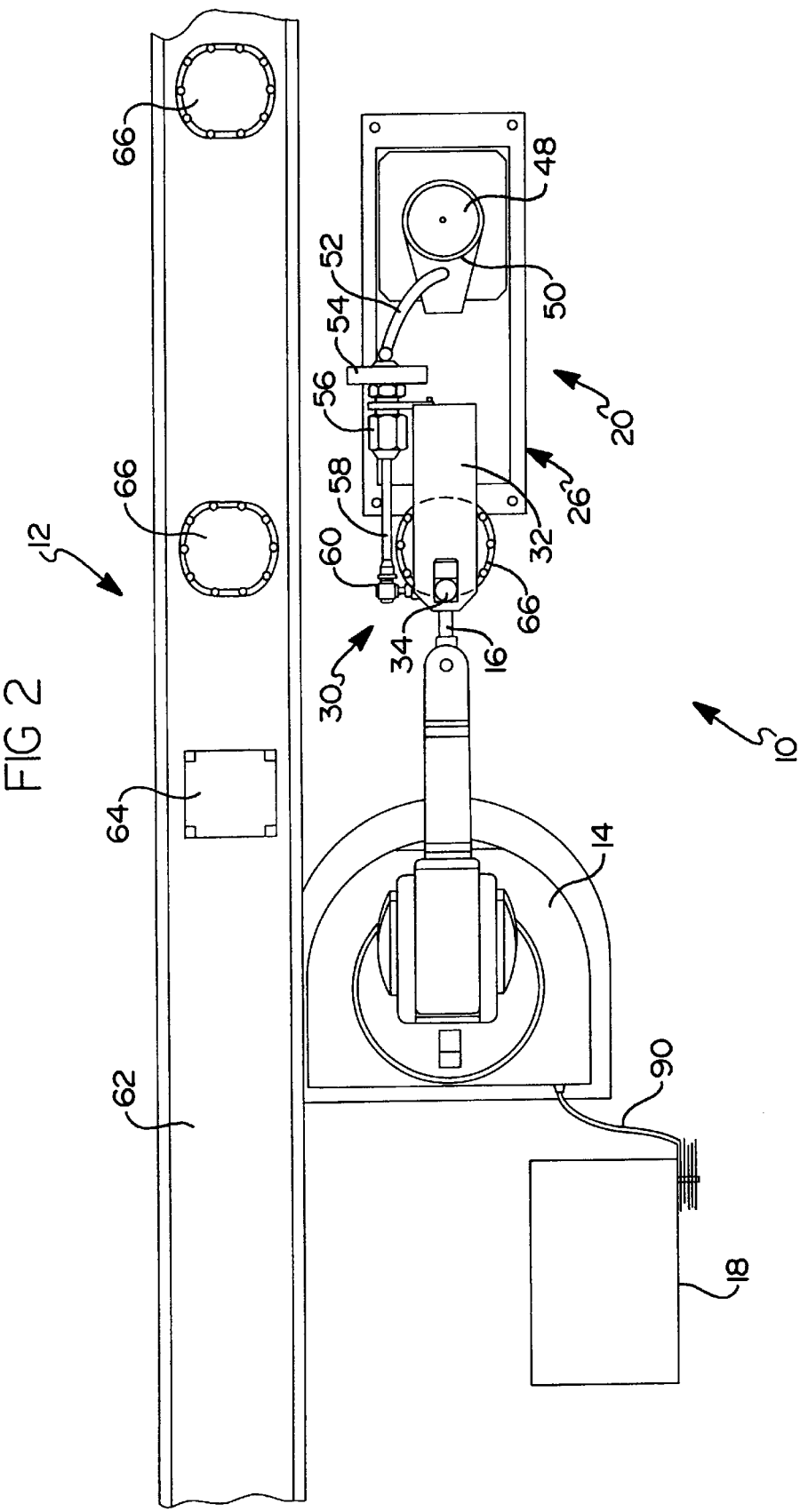
FIG. 2 is a top plan view of the robot based sealant dispensing system shown in FIG. 1.

Referring now to FIGS. 1 and 2, the robot based dispensing system 10 is shown according to a preferred embodiment of the present invention. More particularly, FIGS. 1 and 2 are environmental views which show the manufacturing workstation 12 in which the robot based dispensing system 10 operates. A six-axis robotic manipulator 14 operates within the manufacturing workstation 12 and is outfitted with an end effector gripping tool 16. The preferred robotic manipulator 14 for this application is the IRB 6400 manufactured by ABB Flexible Automation Inc., the assignee of the present invention. A seven-axis robot controller 18 executes the control algorithms for operating the robotic manipulator 14. The preferred robot controller is the S4C controller, also manufactured by ABB Flexible Automation Inc. A PLC unit 68 is used as the programming and operator interface for robot controller 18. It should be noted that the robot controller 18 can communicate with many types of PLC or personal computer based controllers 68 through a standard field bus.

As will be discussed in greater detail below, six of the seven axial control ports associated with robot controller 18 are used for controlling the six axes of motion of the robotic manipulator 14. Thus, in the present implementation, all six axes of motion provided by the robotic manipulator 14 are utilized so that the end effector or gripping tool 16 has a complete range of motion within a three-dimensional coordinate space. As will be appreciated, this complete range of motion becomes important when applying sealant to surfaces which lie in two or more dimensional planes, and a smooth and consistent robotic motion is required.

As disclosed, the robot controller 18 includes a seventh axis or control port 76, which may be used for controlling an external source associated with robotic manipulator 14. As part of the present invention, this seventh axis 76 is used for controlling a sealant dispensing system 20. As shown in FIGS. 1 and 2, the sealant dispensing system 20 is also located within the manufacturing workstation 12. In the preferred embodiment, sealant dispensing system 20 is used as a fixed location dispensing system having a fixed position dispensing nozzle 40 for delivering a controlled amount of RTV sealant onto a part or subassembly arriving at the workstation 12.

A pedestal structure 22 supports the sealant delivery components 30 and sealant supply components 42 associated with the sealant dispensing system 20. The pedestal structure 22 includes a fixed base 26 which is secured to the floor within the workstation 12. A stanchion 28 is welded to the fixed base 26 and extends vertically therefrom for supporting a cantilevered support beam 32, to which the sealant delivery components 30 are secured. A servo-controlled motor and resolver unit 34 is used to drive an applicator screw pump 36.

Figure 3:
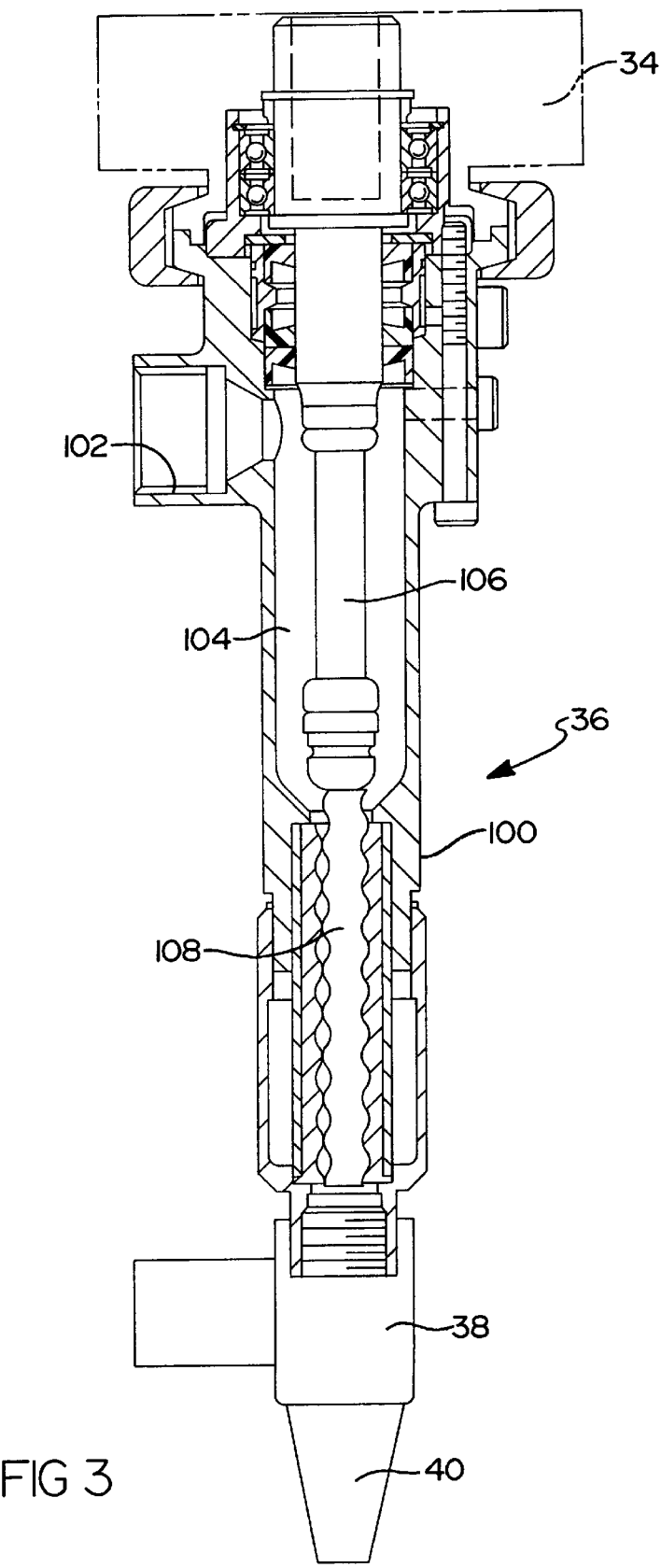
FIG. 3 is partial sectional view of the sealant dispensing pump associated with the present invention.

With brief reference to FIG. 3, the dispensing end of the applicator screw pump 36 is outfitted with an anti-drip valve 38 and a tapered dispensing nozzle 40. The pump 36 includes a housing 100 to which the servo motor 34 is secured. An intake port 102 is provided on one side of the housing 100 for delivering the RTV sealant into a reservoir 104. The intake port 102 is connected to the delivery valve 60. A shaft 106 is axially supported by the housing 100, and driven by the servo motor 34. The lower end of the shaft 106 drives the screw pump mechanism 108. As the screw pump mechanism 108 is rotated by the shaft 106, the RTV sealant is dispensed through the nozzle 40 and can then be applied to a subassembly. During the controlled operation of sealant dispensing system 20, the servo-motor 34 and applicator pump 36 are controlled for delivering and applying a precise shape, size, and quantity of sealant to the subassembly arriving at workstation 12. As part of the present invention, the robot 14 can pick up a plug (not shown) and place it on the nozzle 40 for shutting off the nozzle and preventing the RTV sealant from drying out.

Returning to FIGS. 1 and 2, the sealant supply components 42 associated with sealant dispensing system 20 include a sealant supply bucket 44 and one or more supply lines 46 through which the sealant is drawn by a supply pump assembly 48. The supply pump assembly 48 also includes a supply pressure transducer 50 which allows the supply pressure within supply line 52 to be closely monitored. As shown, supply line 52 extends between supply pump assembly 48 and a pressure regulator 54 which is disposed along the sealant supply system to ensure a consistent RTV delivery pressure. The delivery side of sealant dispensing system 20 includes a delivery pressure transducer 56 so that the delivery pressure can be monitored in conjunction with the supply pressure. As will be described in greater detail below, the supply pressure and the delivery pressure is monitored by an algorithm implemented within robot controller 18. These real time pressure valves can also be displayed through a personal computer display or a HMI display (not shown). A delivery line 58 extends between the delivery pressure transducer 56 and the delivery valve 60. As shown, the intake port 102 of applicator screw pump 36 is connected to the delivery valve 60 so that the flow of RTV sealant to the applicator screw pump 36 can be precisely controlled. The delivery valve 60 is also controlled by robot controller 18.

A suitable conveyor or material handling system 62 runs through workstation 12 for transporting any number of pallets 64 into the workstation 12. Each pallet 64 supports a part or subassembly to which RTV sealant will be applied. In the present invention, the part or subassembly is a rear end cover 66 having a gasket surface to which RTV sealant is applied prior to its assembly with a rear end housing (not shown). However, it should be understood that the present invention can apply sealant to a variety of components including but not limited to oil pans, valve covers, transmission covers, and gaskets.

In operation, sealant dispensing system 20 is used for delivering precise placement of a predetermined size, shape and quantity of RTV sealant to the rear end cover 66. This application of RTV sealant is more easily achieved by the dispensing system 20 associated with the present invention because the RTV sealant is dispensed from a fixed position dispensing nozzle 40, while the robot 14 and end effector 16 are utilized for moving the rear end cover 66 in a predetermined pattern of motion beneath the fixed dispensing nozzle 40.

The precision of the present invention is achieved in that servo-motor 34 is feedback controlled through the seventh axis of the robot controller 18. More specifically, the robot controller 18 sends a control signal to servo-motor 34 for controlling the angular position and speed of the motor drive shaft. Accordingly, servo-motor 34 controls the precise angular motion of applicator screw pump 36. A resolver unit contained within servo-motor 34 provides a feedback signal to the seventh axis of robot controller 18 which allows for the precise dispensing of the RTV sealant. The delivery valve 60 is opened and closed by the robot controller 18 at precise time intervals for controlling the application and dispensing of the RTV sealant.

In the prior applications discussed above, the sixth axis of the robot was utilized for driving the dispenser pump. However, this prior technique leaves the robot with only five axes of movement which limits the freedom of motion of the robot. In addition, smoother and consistent movement of the robot can be achieved by utilizing all six axes of motion control because jumping or skipping movement of the robotic manipulator is eliminated.

Figure 4:
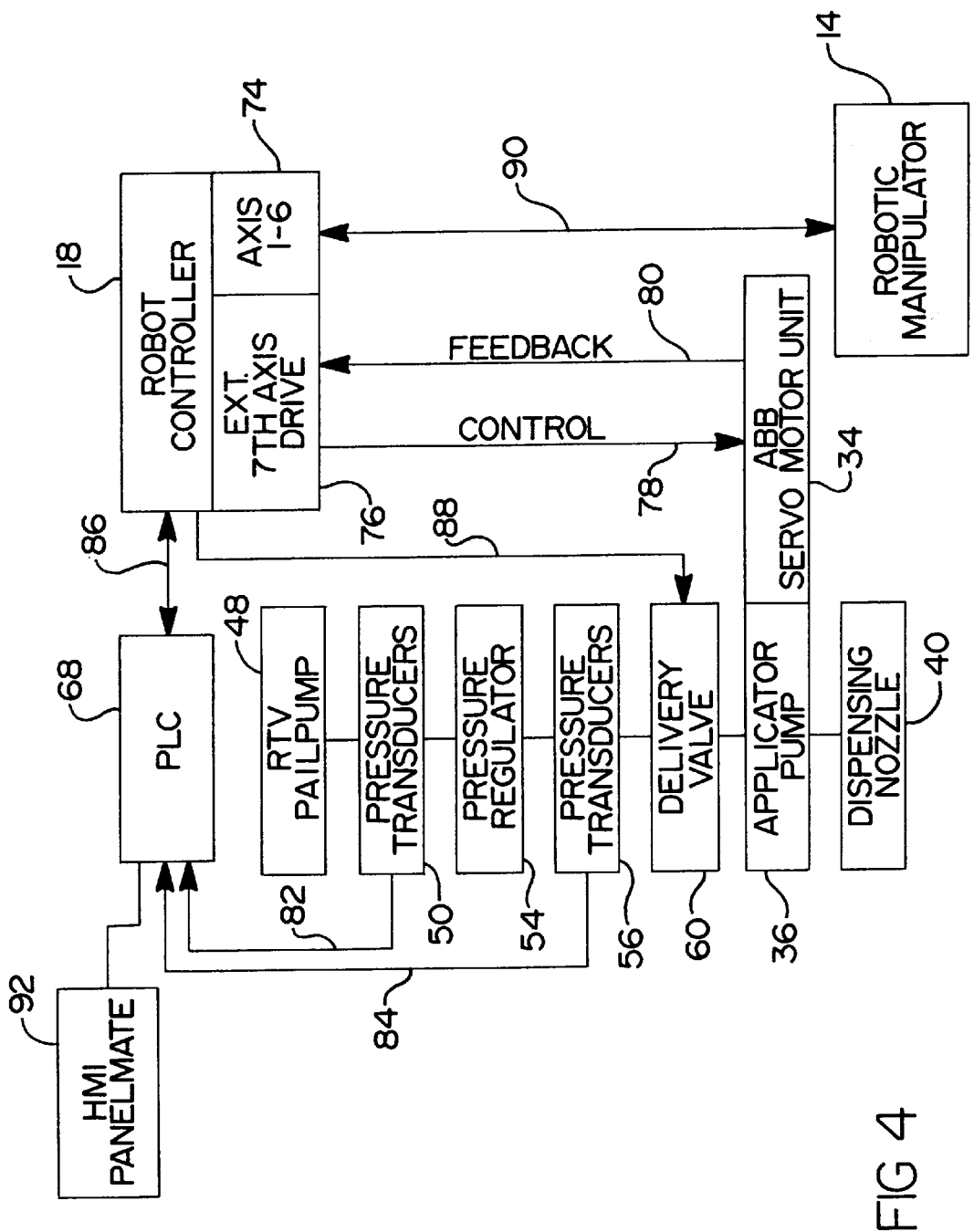
FIG. 4 is a block diagram of the control system for implementing the robot based dispensing system according to a preferred embodiment of the present invention.
Figure 5:
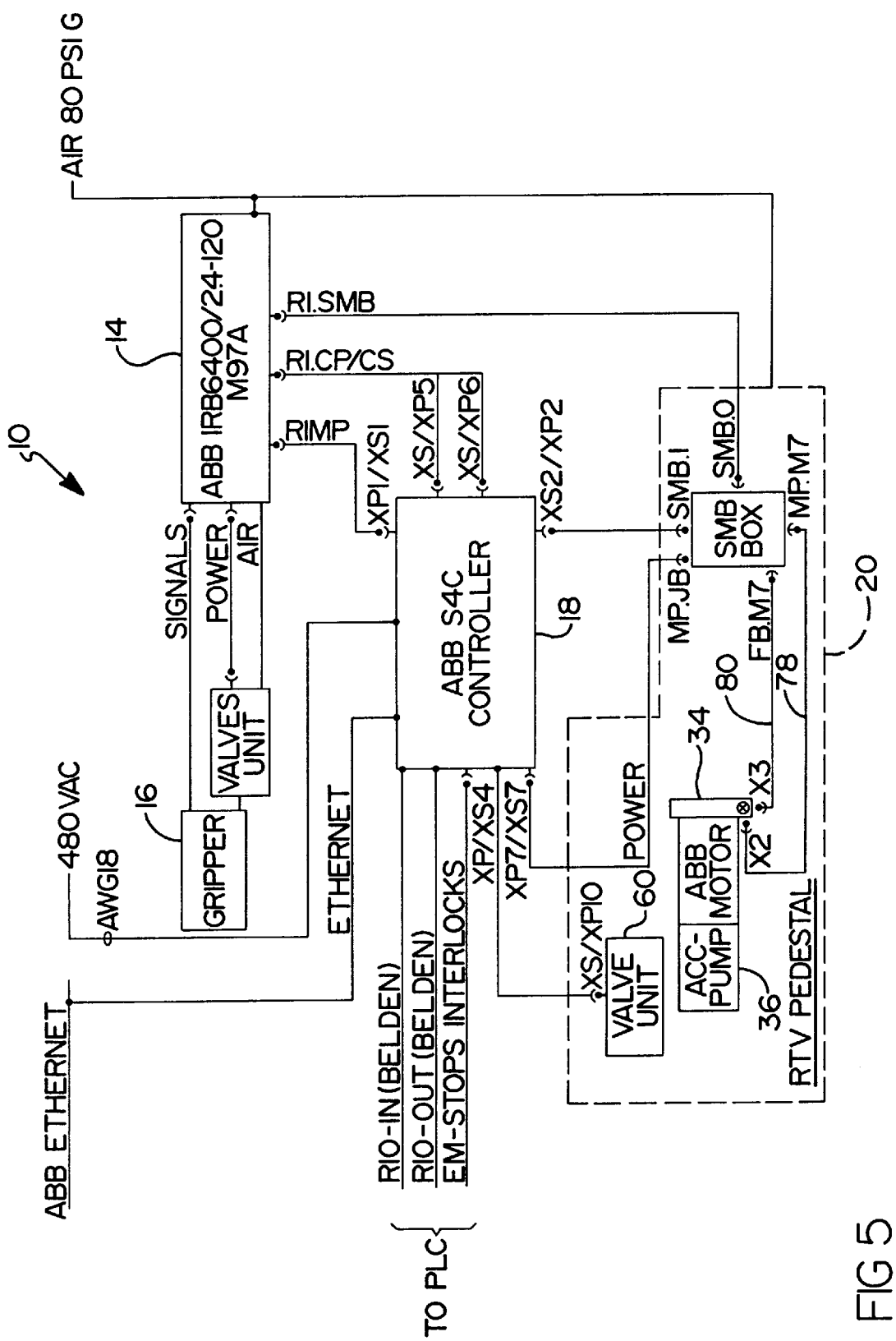
FIG. 5 is a schematic diagram of the robot based dispensing system.

Turning now to FIGS. 4 and 5, a block diagram and schematic diagram (respectively) show the control scheme of the present invention. The components of the robot based dispensing system 10 are represented as functional blocks in FIG. 4. The electrical connections between the components of dispensing system 10 are shown in FIG. 5. As disclosed, the supply pump assembly 48 pumps the RTV sealant through pressure regulator 50, and the supply pressure is monitored by supply pressure transducer 50. A supply pressure signal 82 generated by pressure transducer 50 is provided as feedback to the supply pump 48, and this supply pressure signal 82 is further monitored by the PLC 68 and the robot controller 18. The RTV sealant flows through delivery valve 60 and into the intake port 102 of the applicator pump 36. The delivery pressure of the RTV sealant is monitored via delivery pressure transducer 56. A delivery pressure signal 84 generated by pressure transducer 56 is also provided as feedback to the PLC 68. The supply and delivery pressure signals 82, 84 are communicated to the robot controller 18 over a data bus 86, and are used to enhance the precise control of sealant dispensing system 20, and especially the servo motor 34.

A unique feature of the present invention is that a single control panel 92 is used for supporting PLC 68 and robot controller 18 within workstation 12. Thus, the area within the workstation 12 for control panels is reduced. Additionally, only one PLC controller and control program needs to be maintained.

FIGS. 4 and 5 also disclose the interconnection between the robot controller 18, servo motor 34, and the robotic manipulator 14. The control block 74 functionally represents the six bidirectional channels (axes 1–6) of axial control provided between the robot controller 18 and the robotic manipulator 14. The control lines 90 connect between the robotic manipulator 14 and control block 74. The control block 76 functionally represents the seventh axis bidirectional control channel which is used for controlling the servo motor 34. This bidirectional control channel includes control line 78 and feedback line 80.

In operation, the robot controller 18 sends a control signal to servo motor 34 via line 78 for controlling the angular position, acceleration and velocity of the motor drive shaft. Thus, the servo motor 34 in turn controls the precise angular motion of the applicator screw pump 36. The resolver unit contained within servo motor 34 provides a feedback signal via feedback line 80 to the seventh axis control block 76. Also shown is that the delivery valve 60 is controlled by one of the external control ports of robot controller 18 via control line 88. As will be appreciated, the servo motor 34, and thus the sealant dispensing system 20 is controlled in a closed loop fashion which greatly assists in the precise application of the RTV sealant to any number of parts.

Another advantage of the present invention is the elimination of a second control panel from the workstation 12. In the prior applications for dispensing RTV sealant, a separately controlled servo motor and applicator pump were connected to a separate (second) control panel. The communication between the second control panel for the servo motor and the first control panel for the robotic manipulator was handled by one or more PLC units. In the present invention, a single electrical control panel 92 is used. Eliminating the second control panel significantly reduces the cost and complexity of installing and maintaining the robot based dispensing system 10 of the present invention. Moreover, the present invention provides a single point of control for making modifications to both the robotic control algorithms, and the servo motor and application pump control algorithms, because only one operator interface (i.e. control panel 92 and PLC 68) is used. This in turn makes change over and alternate production setups easier to implement and test before going into live production.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. An automated system for performing an operation on a component within a manufacturing workstation comprising:
    a robot controller having seven axes of motion control;
    a robotic manipulator connected to the robot controller and having six axes of motion, the robotic manipulator including tooling for grasping the component upon which the operation is performed;
    a fixed location tool for performing the operation; and
    a servo mechanism for operating the fixed location tool, the servo mechanism being controlled by one of the seven axes of motion control of the robot controller;
    whereby the robotic manipulator moves the component with respect to the fixed location tool for performing the operation.

2. The automated system of claim 1 wherein the fixed location tool is a sealant dispensing system.

3. The automated system of claim 2 wherein the sealant dispensing system dispenses RTV sealant.

4. The automated system of claim 1 wherein the robot controller generates a control signal for changing the angular speed and position of the servo mechanism.

5. The automated system of claim 4 wherein the servo mechanism includes a resolver unit for generating a feedback signal representing the angular speed and position of the servo mechanism.

6. The automated system of claim 1 wherein the servo mechanism is a servo motor.

7. A sealant dispensing system for dispensing a sealant to a component comprising:
    a controller having seven control channels for operating at least seven independent axes of motion;
    a six axis robotic manipulator connected to six of the seven control channels of the controller, the robotic manipulator operative for grasping the component arriving at a conveyor fed workstation;
    a fixed sealant dispensing unit positioned in proximity to the robotic manipulator, the sealant dispensing unit having a nozzle for dispensing the sealant; and
    a servo motor for driving the sealant dispensing unit, the servo motor being controlled by the seventh axis of the controller;
    whereby the robotic manipulator picks the component from the conveyor and manipulates the component with respect to the nozzle of the sealant dispenser for applying the sealant to the surface of the component.

8. The sealant dispensing system of claim 7 wherein the controller provides a control signal to the servo motor for controlling the speed and position of the servo motor.

9. The sealant dispensing system of claim 8 wherein the controller receives a feedback signal from the servo motor relating to the speed and position of the servo motor.

10. The sealant dispensing system of claim 9 wherein the controller operates the robotic manipulator and the servo motor in response to the feedback signal for dispensing a predetermined amount of the sealant to the component.

11. The sealant dispensing system of claim 7 wherein a supply pump provides sealant to the dispensing unit.

12. The sealant dispensing system of claim 7 wherein the dispensing unit includes a dispensing pump driven by the servo motor.

13. The sealant dispensing system of claim 7 wherein the dispensing unit includes a transducer for monitoring a supply pressure and a delivery pressure.

14. The sealant dispensing system of claim 7 wherein a single electronic panel is used for the controller and the dispensing unit.

15. The sealant dispensing system of claim 7 wherein the component is one of a rear axle cover, an oil pan, a valve cover, a transmission cover, and a gasket having a mating surface for receiving the sealant.

16. A sealant dispensing system for dispensing a sealant to a component comprising:
    a controller having at least seven control channels for operating at least seven independent axes of motion;
    a six axis robotic manipulator connected to six of the seven control channels of the controller, the robotic manipulator operative for grasping the component arriving at a conveyor fed workstation;
    a fixed sealant dispensing unit positioned in proximity to the robotic manipulator, the sealant dispensing unit having a nozzle for dispensing the sealant; and
    a servo motor for driving the sealant dispensing unit, the servo motor being controlled by the seventh axis of the controller and providing a feedback signal to the controller;
    whereby the robotic manipulator picks the component from the conveyor and manipulates the component with respect to the nozzle of the sealant dispenser for applying the sealant to the surface of the component.

17. The sealant dispensing system of claim 16 wherein the servo motor includes a resolver unit for generating the feedback signal, the feedback signal representing the angular speed and position of the servo motor.

18. The sealant dispensing system of claim 16 wherein at least one pressure transducer provides a signal to the controller representing the pressure of the sealant within the sealant dispenser.

19. The sealant dispensing system of claim 18 wherein the signal is used by the controller for controlling the pressure of the sealant within the sealant dispenser.

20. The sealant dispensing system of claim 16 wherein the dispensing unit includes a dispensing pump driven by the servo motor.

\* \* \* \* \*